United States Patent
Oliverio

(10) Patent No.: US 9,862,309 B2
(45) Date of Patent: Jan. 9, 2018

(54) VEHICLE SILL ILLUMINATION ASSEMBLY

(71) Applicant: Nissan North America, Inc., Franklin, TN (US)

(72) Inventor: Sean Oliverio, Walled Lake, MI (US)

(73) Assignee: Nissan North America, Inc., Franklin, TN (US)

( * ) Notice: Subject to any disclaimer, the term of this patent is extended or adjusted under 35 U.S.C. 154(b) by 94 days.

(21) Appl. No.: 14/637,186

(22) Filed: Mar. 3, 2015

(65) Prior Publication Data

US 2016/0257244 A1 Sep. 8, 2016

(51) Int. Cl.
*B60Q 1/32* (2006.01)
*F21S 8/10* (2006.01)

(52) U.S. Cl.
CPC .......... *B60Q 1/323* (2013.01); *F21S 48/2237* (2013.01); *F21S 48/2268* (2013.01); *B60Q 2900/10* (2013.01); *B60Q 2900/30* (2013.01); *F21S 48/2281* (2013.01)

(58) Field of Classification Search
CPC .. B60Q 3/00; B60Q 1/32; B60Q 1/323; B60R 3/002; B60R 13/043
USPC ................................................. 296/204, 209
See application file for complete search history.

(56) References Cited

U.S. PATENT DOCUMENTS

| | | | | |
|---|---|---|---|---|
| 4,463,962 A * | 8/1984 | Snyder | .................. | B60R 3/002 280/164.1 |
| 4,544,991 A * | 10/1985 | Gorsuch | ............... | B60Q 1/323 280/164.1 |
| 4,557,494 A * | 12/1985 | Elwell | ................... | B60Q 1/323 24/514 |
| 5,915,830 A * | 6/1999 | Dickson | ................. | B60R 3/002 362/495 |
| 6,062,633 A * | 5/2000 | Serizawa | ........... | B60R 16/0215 296/199 |
| 6,193,306 B1 * | 2/2001 | Lee | ....................... | B62D 25/02 296/181.4 |
| 6,244,734 B1 * | 6/2001 | Hulse | .................. | B60Q 1/0011 362/495 |

(Continued)

FOREIGN PATENT DOCUMENTS

| | | | | |
|---|---|---|---|---|
| EP | 0339238 A2 * | 11/1989 | ............ | B60R 13/04 |
| JP | 2006007845 A * | 1/2006 | | |

OTHER PUBLICATIONS

Unpublished U.S. Appl. No. 14/326,068, filed Jul. 8, 2014, entitled Self-Powered Illumination Assembly.

*Primary Examiner* — H Gutman
(74) *Attorney, Agent, or Firm* — Global IP Counselors, LLP

(57) ABSTRACT

A vehicle sill illumination assembly has a main body, an illumination panel and a controller. The main body includes a first portion, a second portion and a third portion that together define an inverted U-shaped structure as viewed in cross-section. The first portion has an upright surface. The second portion extends horizontally inboard from an upper edge of the first section. The third portion extends downward from an inboard side of the second portion. The illumination panel is installed to an area of the first portion of the main body such that the illumination panel faces in an outboard direction with the main body installed to a vehicle sill structure. The controller is located within the main body and is configured to control illumination of the illumination panel.

13 Claims, 8 Drawing Sheets

(56) References Cited

U.S. PATENT DOCUMENTS

| | | | | |
|---|---|---|---|---|
| 6,250,785 B1* | 6/2001 | Mallia | ............ | B60Q 1/323 |
| | | | | 362/495 |
| 7,556,412 B2* | 7/2009 | Guillermo | ............ | A42B 3/044 |
| | | | | 362/551 |
| 7,712,933 B2* | 5/2010 | Fleischmann | ............ | B60Q 1/2696 |
| | | | | 362/495 |
| 8,231,169 B2* | 7/2012 | Leopold | ............ | B62D 25/02 |
| | | | | 280/164.1 |
| 8,668,253 B2* | 3/2014 | Bauer | ............ | B60R 16/0215 |
| | | | | 296/1.08 |
| 9,162,625 B2* | 10/2015 | Watanabe | ............ | B60R 13/04 |
| 9,308,860 B2* | 4/2016 | Cha | ............ | B60R 3/02 |
| 9,399,431 B2* | 7/2016 | Crandall | ............ | B60R 3/002 |
| 2005/0213351 A1* | 9/2005 | Yang | ............ | B60Q 1/323 |
| | | | | 362/633 |
| 2009/0251920 A1* | 10/2009 | Kino | ............ | B60Q 1/323 |
| | | | | 362/602 |
| 2010/0271837 A1 | 10/2010 | Yamauchi et al. | | |
| 2011/0115375 A1* | 5/2011 | Shiratsuchi | ............ | B60Q 1/2669 |
| | | | | 315/77 |
| 2012/0098231 A1* | 4/2012 | Huotari | ............ | B60R 3/02 |
| | | | | 280/166 |
| 2014/0119038 A1* | 5/2014 | Mulder | ............ | G09F 13/06 |
| | | | | 362/509 |
| 2015/0046027 A1* | 2/2015 | Sura | ............ | B60K 35/00 |
| | | | | 701/36 |
| 2016/0059774 A1* | 3/2016 | Crandall | ............ | B60Q 1/323 |
| | | | | 280/164.1 |

\* cited by examiner

VEHICLE SILL ILLUMINATION ASSEMBLY

BACKGROUND

Field of the Invention

The present invention generally relates to a sill illumination assembly for a vehicle. More specifically, the present invention relates to a sill illumination assembly with an illumination panel that faces in an outboard direction relative to the vehicle.

Background Information

All vehicles include at least one door and at least one corresponding door opening. The vehicle door opening is defined by several structures, including a door sill structure. When the door is in a closed orientation, the sill structure is exposed. When the door is in a closed orientation, the sill structure is at least partially covered and concealed by the door. The sill structure can be left in a painted state or can be provided with a trim element that covers and protects some or all of the sill structure that is exposed when the door is in the open orientation. Such trim elements include, for example, coverings referred to as sill plates and kick plates. Sill plates and kick plates can be simple rubber sheet-like layers or plastic covers that protect the sill structure, but can additionally be decorative.

SUMMARY

One object of the disclosure is to provide a vehicle sill structure with a kick plate and sill plate cover that also provides illumination when the vehicle door is open.

In view of the state of the known technology, one aspect of the present disclosure is to provide a vehicle sill illumination assembly with a main body, an illumination panel and a controller. The main body has a first portion, a second portion and a third portion that together define an inverted U-shaped structure as viewed in cross-section. The first portion has an upright surface. The second portion extends horizontally inboard from an upper edge of the first section. The third portion extends downward from an inboard side of the second portion. The illumination panel is installed to the upright surface of the first portion of the main body such that the illumination panel faces in an outboard direction with the main body installed to a vehicle sill structure. The controller is located within the main body and is configured to control illumination of the illumination panel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
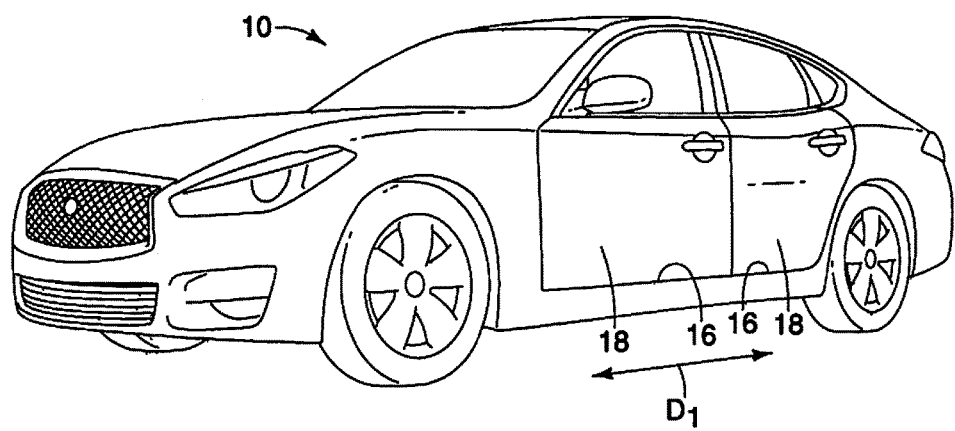
FIG. 1 is a perspective view of a vehicle that includes illumination assemblies that are at least partially concealed with doors in a closed orientation in accordance with a first embodiment.
Figure 2:
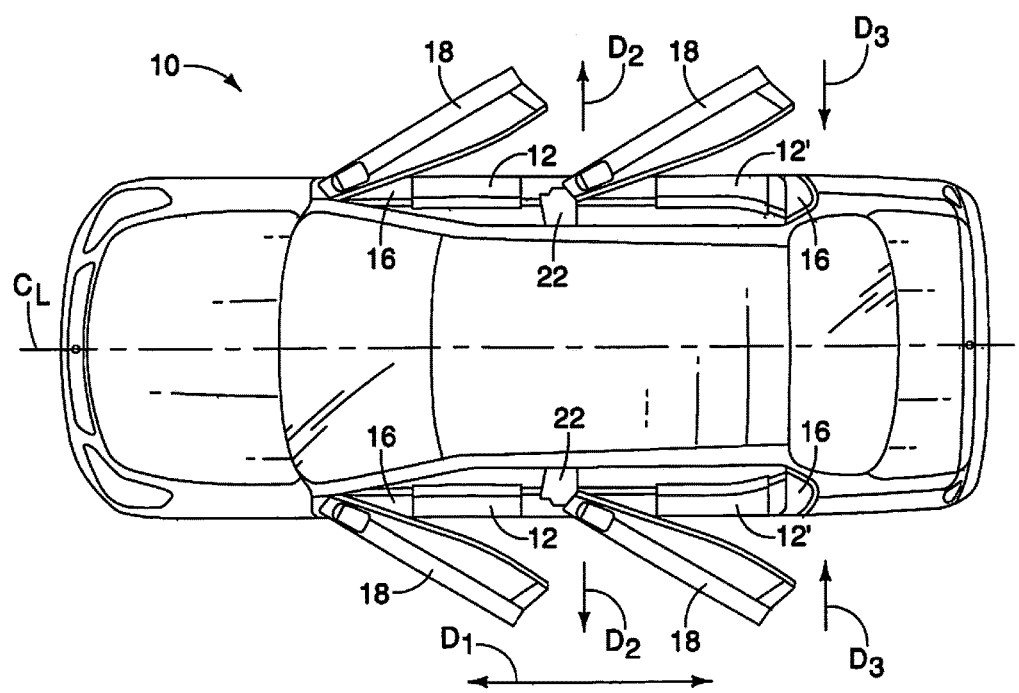
FIG. 2 is a top view of the vehicle depicted in FIG. 1 with doors open showing four illumination assemblies installed to sill assemblies that define door openings in accordance with the first embodiment.

Referring initially to FIG. 1, a vehicle 10 is illustrated in accordance with a first embodiment. As shown in FIG. 2, the vehicle 10 includes a plurality of sill illumination assemblies 12 and 12' (sill trim assemblies) that are described in greater detail below following a description of various structural features of the vehicle 10.

The vehicle 10 is depicted as a four door passenger vehicle. However, the sill illumination assemblies 12 and 12' described herein below can be employed in any of a variety and styles of vehicles. More specifically, the vehicle 10 can be a two-door coupe, a sports utility vehicle (SUV), a pickup truck, a commercial vehicle or a conventional vehicle having doors. The sill illumination assemblies 12 and 12' are designed and configured to serve as sill trim assemblies, having a decorative appearance that blends in with the design features of the vehicle 10. Such design features are not highlighted in the following description. However, it should be understood from the drawings and the description herein that the overall appearance of each of the sill illumination assemblies 12 and 12' can be modified to conform to the overall design of the vehicle 10.

As shown in FIGS. 1 and 2, the vehicle 10 includes four door openings 16 (also referred to as vehicle closure openings) and four doors 18, with one door 18 being installed for pivotal movement to a pillar that defines the corresponding one of the door openings 16. Each door 18 is movable between a closed orientation (FIG. 1) covering the corresponding door opening 16, and an open orientation (FIG. 2) exposing the corresponding door opening 16. When the doors 18 are in their respective open orientations, the sill illumination assemblies 12 and 12' are exposed along with surfaces that define the door openings 16. When the doors 18 are in their respective closed orientations, the sill illumination assemblies 12 and 12' are at least partially covered by the doors 18 along with the surfaces that define the door openings 16.

Further, as shown in FIG. 2, the sill illumination assemblies 12 and 12' have differing shapes. Specifically, the sill illumination assemblies 12 are shaped to fit in the door openings 16 corresponding to front doors and the sill illumination assemblies 12' are shaped to fit in door openings 16 corresponding to rear doors. However, other than differences in shape, the sill illumination assemblies 12 and 12' are for all intent and purposes the same. Therefore, description below is directed to one of the sill illumination assemblies 12, for the sake of brevity.

For purposes of understanding the sill illumination assembly 12, only one of the door openings 16 is described herein below. However, it should be understood from the drawings and the description herein that the description of the one door opening 16 applies to any door opening, regardless of its location and overall shape within the vehicle 10. As will be clear from the description herein below, the sill illumination assembly 12 can be modified and shaped to install to any of a variety of differing sill structures that define door openings, including the door openings 16.

Figure 3:
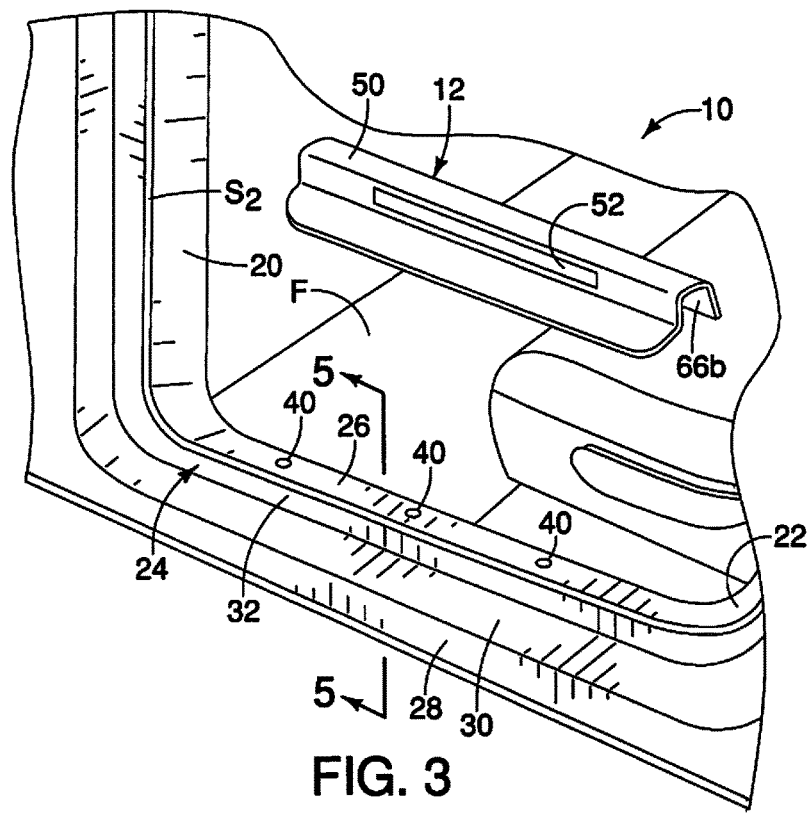
FIG. 3 is a perspective exploded view of one of the door openings of the vehicle depicted in FIGS. 1 and 2, showing a sill structure and a corresponding one of the illumination assemblies in accordance with the first embodiment.
Figure 4:
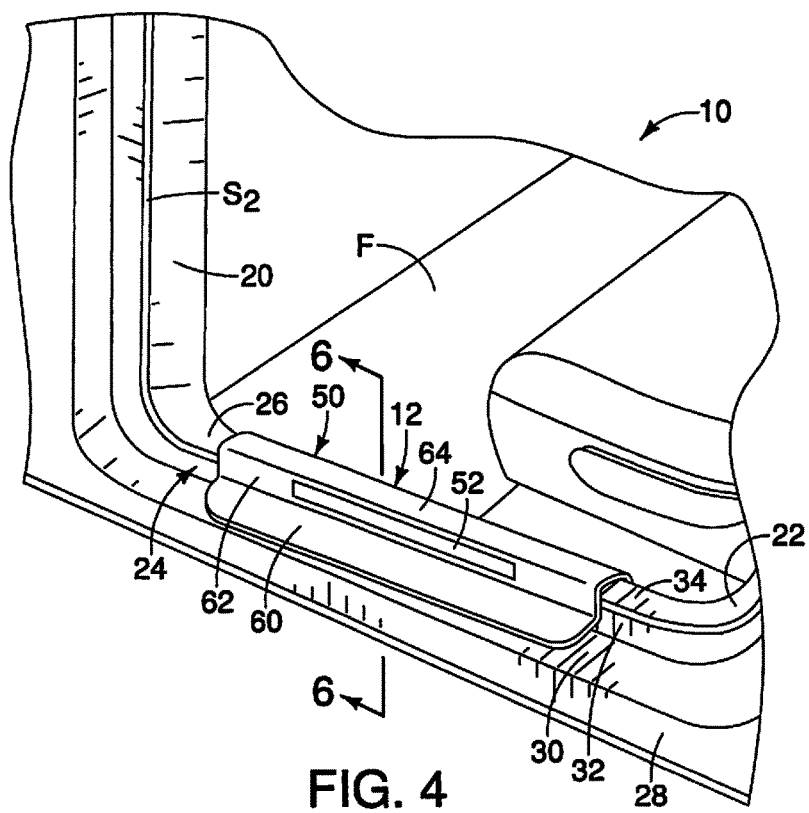
FIG. 4 is another perspective view of one of the door openings of the vehicle depicted similar to FIG. 3, showing the illumination assembly installed to the sill structure in accordance with the first embodiment.

FIGS. 3 and 4 show one of the door openings 16 with its corresponding door 18 removed. The depicted door opening 16 is defined by at least a first pillar structure 20, a second pillar structure 22 and a sill structure 24. The first pillar structure 20 and the second pillar structure 22 are upright structures that extend from the sill structure 24 in an upward direction in a conventional manner. The sill structure 24 extends in a vehicle longitudinal direction $D_1$ from a lower area of the first pillar structure 20 to a lower area of the second pillar structure 22 in a conventional manner. The depicted door opening 16 in FIGS. 3 and 4 is a front door opening. However, it should be understood that the door opening 16 can also be a rear door opening.

Figure 5:
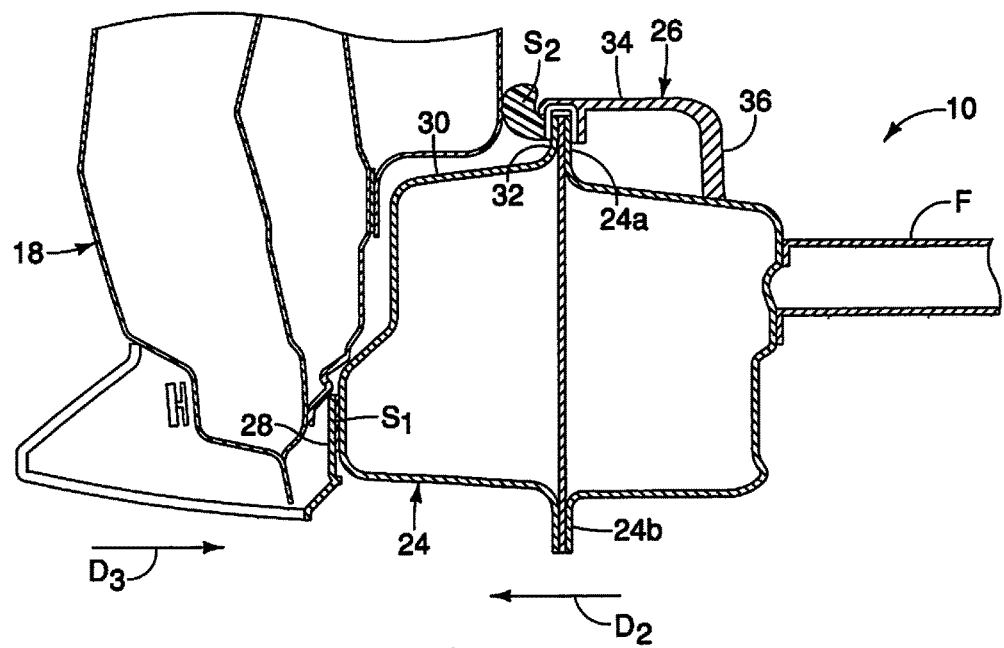
FIG. 5 is a cross-sectional view taken along the line 5-5 in FIG. 3 showing details of the sill structure and a trim panel covering portions of the sill structure with the illumination assembly removed and with the door in the closed orientation in accordance with the first embodiment.
Figure 6:
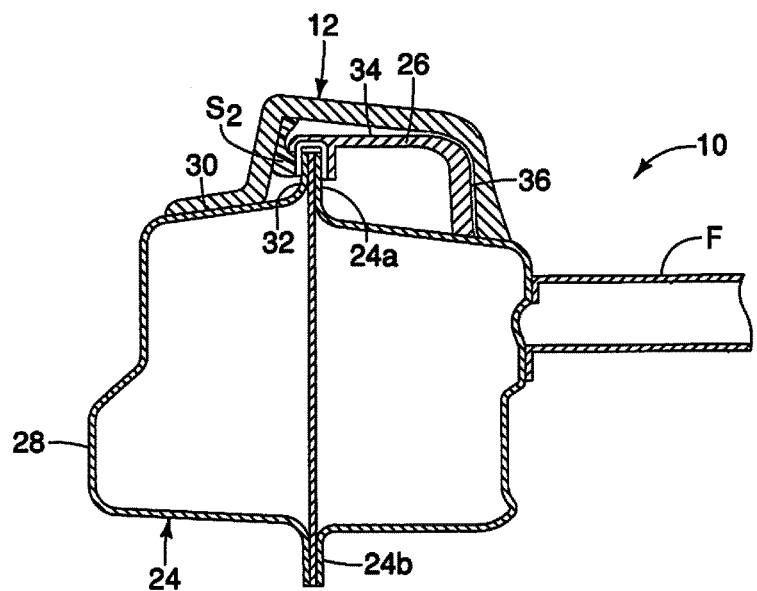
FIG. 6 is another cross-sectional view taken along the line 6-6 in FIG. 4 showing details of the sill structure and the trim panel with the illumination assembly installed to the sill structure and the trim panel with the door in the open orientation in accordance with the first embodiment.
Figure 7:
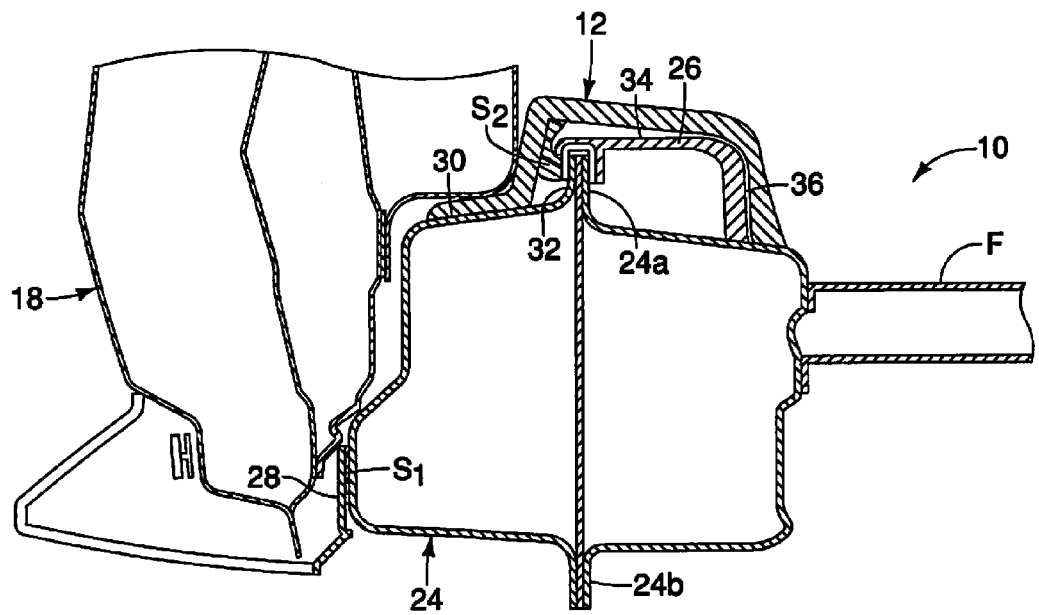
FIG. 7 is yet another cross-sectional view similar to FIGS. 5 and 6 showing details of the sill structure and the trim panel with the illumination assembly installed to the sill structure and the trim panel with the door in the closed orientation in accordance with the first embodiment.

Each of the first pillar structure 20, the second pillar structure 22 and the sill structure 24 includes a plurality of structural elements that are shaped and welded or otherwise rigidly fixed to one another to define the corresponding portion of the body structure of the vehicle 10, and further define the door opening 16. For example, the sill structure includes seams 24a and 24b where separate panels are welded together, as shown in FIGS. 5-7. Since pillar structures and sill structures are conventional vehicle features further description is omitted for the sake of brevity.

Portions of the sill structure 24 include trim elements, such as a trim panel 26 that covers areas of the sill structure 24. The trim panel 26 is shaped and configured to cover several inboard surfaces of the sill structure 24, as needed or desired. For example, in an economy vehicle, the trim panel 26 can be shaped and dimensioned to only cover one or two surfaces of the sill structure 24. In a luxury vehicle, the trim panel 26 can be shaped and dimensioned to cover all inboard surfaces if the sill structure 24 and adjacent surfaces of the first and second pillar structures 20 and 22. For purposes of understanding the invention, the sill structure 24 and the trim panel 26 are considered to be one structure. Therefore, references made to surfaces of the trim panel 26 are also to be considered as references to surfaces of the sill structure 24, since the trim panel 26 is considered to be an extension or part of the sill structure 24.

It should further be understood from the drawings and the description herein, that the sill illumination assembly 12 can be used in vehicles that have exposed surfaces of the sill structure 24 that necessarily include trim elements, such as the trim panel 26.

The still structure 24 (and the trim panel 26) is shaped to include a plurality of surfaces that provide, among other features, structural integrity and rigidity. Further, as shown in FIG. 3-6, the sill structure 24 defines surfaces such as a sealing surface 28, a kick plate surface 30, a first surface 32, a second surface 34 and a third surface 36 (only shown in FIG. 7). Each of the sealing surface 28, the kick plate surface 30, the first surface 32, the second surface 34 and the third surface 36 extends from the first pillar structure 20 to the second pillar structure 22.

The sealing surface 28 is an upright surface that is shaped and configured to be contacted by a door seal $S_1$ of the corresponding door 18 (FIGS. 5 and 7 only), with the door 18 in the closed orientation. Since such sealing surfaces are conventional vehicle features, further description is omitted for the sake of brevity.

As shown in FIG. 5-8, the kick plate surface 30 is slightly inclined downward in an outboard direction $D_2$ of the vehicle 10 toward the sealing surface 28, where the outboard direction $D_2$ is defined as a direction extending away from a centerline $C_L$ of the vehicle 10. The centerline $C_L$ of the vehicle 10 extends in the vehicle longitudinal direction $D_1$ through a center of the vehicle 10, as shown in FIG. 2. Further, an inboard direction $D_3$ of the vehicle 10 is defined as a direction extending toward the centerline $C_L$ of the vehicle 10. The kick plate surface 30 is inclined such that water and/or debris is urged to flow along the kick plate surface 30 and drain out of the vehicle 10.

The first surface 32 is an upright surface that extends upward from the kick plate surface 30 to an outboard side of the second surface 34. The second surface 34 is a generally horizontal surface and can include a plurality of openings 40 (FIGS. 3 and 7) used to install the sill illumination assembly 12, as described in greater detail below. The third surface 36 is a generally upright surface that extends downward from an inboard side of the second surface 34 toward a floor F of the vehicle 10. The sill structure 24 (and the trim panel 26) can include additional surfaces whose descriptions are omitted for the sake of brevity. In the depicted embodiment, the openings 40 are provided in the trim panel 26. However, for sill structures that do not include a trim panel 26, the sill structure 24 can alternatively be provided with the openings 40.

As shown in FIGS. 5-8, the trim panel 26 attaches to the seam 24a via a plurality of clamping clips 26a (only one clamping clip 26a is depicted) that is embedded within the overall structure of the trim panel 26 in a conventional manner. A second seal $S_2$ is attached to one or both of the clamping clips 26a and the trim panel 26 such that with the door 18 in the closed orientation, a sealing surface of the door 18 contacts the second seal $S_2$ in a conventional manner, as shown in FIG. 5. As shown in FIGS. 3 and 4, the second seal $S_2$ is an elongated seal that extends completely around the door opening 16 and is similarly attached to the first and second pillar structures 22 and 24 in a conventional manner.

It should be understood from the drawings and the description herein that the sill illumination assembly 12 can be installed to cover a corresponding portion of the second seal $S_2$. Alternatively, a corresponding portion of the second seal $S_2$ can be removed (not shown), if necessary, in order for the sill structure 24 to receive the sill illumination assembly 12.

A description of the sill illumination assembly 12 (also referred to as an illuminated kick plate) is now provided with specific reference to FIGS. 8-16. The sill illumination assembly 12 is basically a vehicle trim element that serves as an illuminated kick plate or illuminated sill cover that overlays a majority, but not necessarily all, of the above mentioned surfaces of the sill structure 24. Specifically, the sill illumination assembly 12 covers a majority (more than half) of the following surfaces of the sill structure 12: the kick plate surface 30, the first surface 32, the second surface 34 and the third surface 36. One or more of the kick plate surface 30, the first surface 32, the second surface 34 and the third surface 36 can be formed with recessed areas (not shown) that receive the sill illumination assembly 12. Alternatively, the kick plate surface 30, the first surface 32, the second surface 34 and the third surface 36 can each be as shown in the drawings without a recessed area with the sill illumination assembly 12 overlaying corresponding portions of the kick plate surface 30, the first surface 32, the second surface 34 and the third surface 36. Further, the sill illumination assembly 12 can be a factory installed item provided to at least one or more of the sill structures 24 within a vehicle or can be an after-market add-on feature installed after the manufacturing of the vehicle 10.

The sill illumination assembly 12 basically includes a main body 50, an illumination panel 52, light sources 54a-54d (FIG. 14), a controller 56 (FIGS. 14-16) a sensor 58 and a light pipe L.

Figure 8:
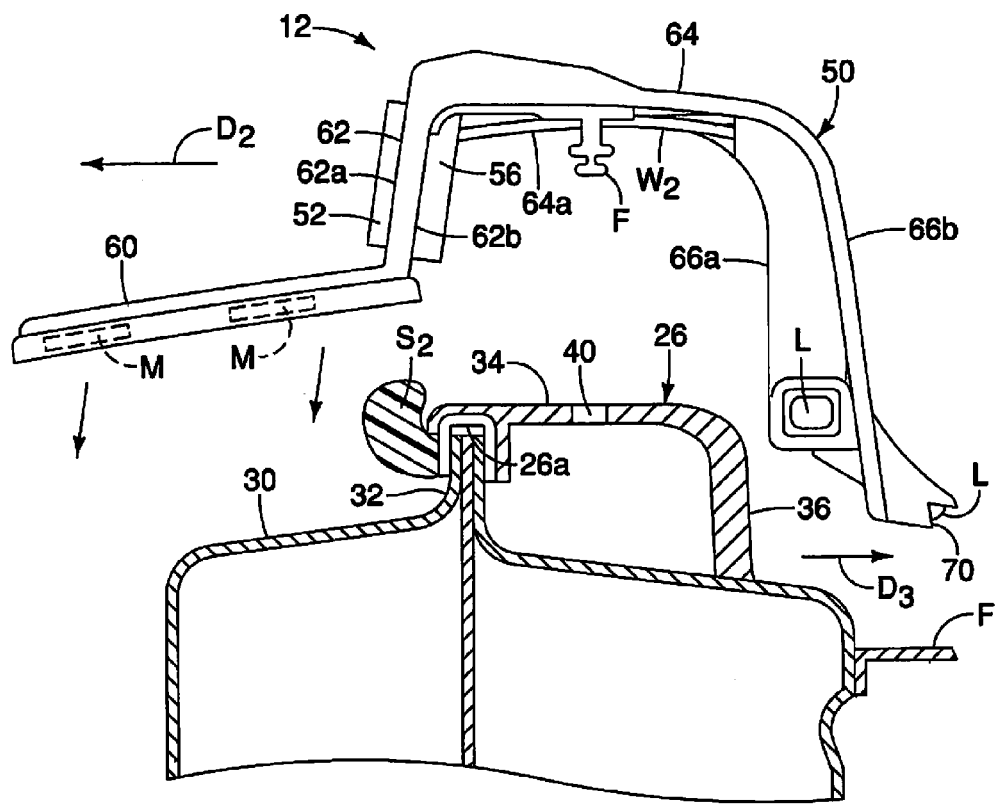
FIG. 8 is an exploded cross-sectional view of the illumination assembly and the trim panel in accordance with the first embodiment.
Figure 9:
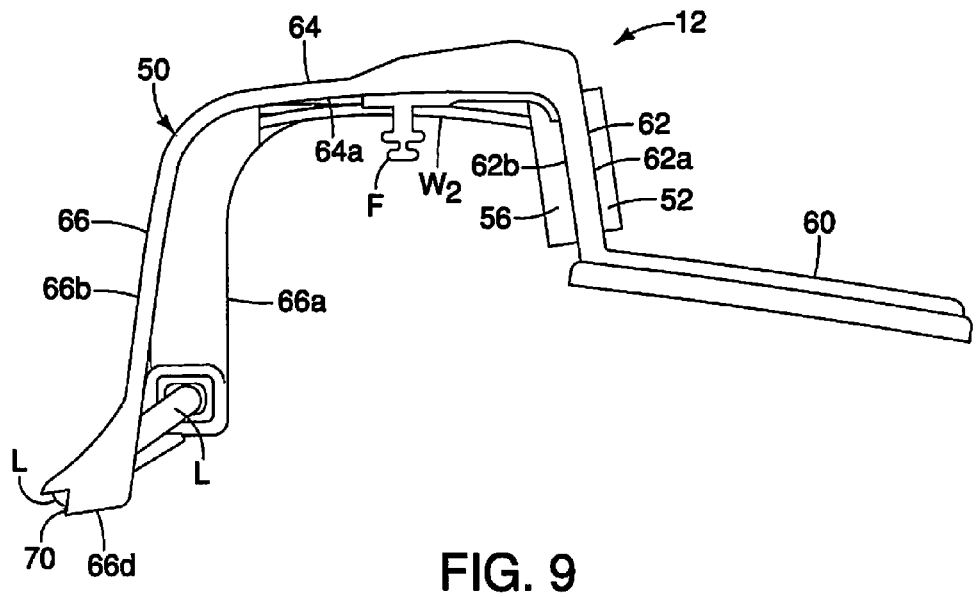
FIG. 9 is a cross-sectional view similar to FIG. 7 showing only the illumination assembly removed from the sill structure and the trim panel in accordance with the first embodiment.
Figure 10:
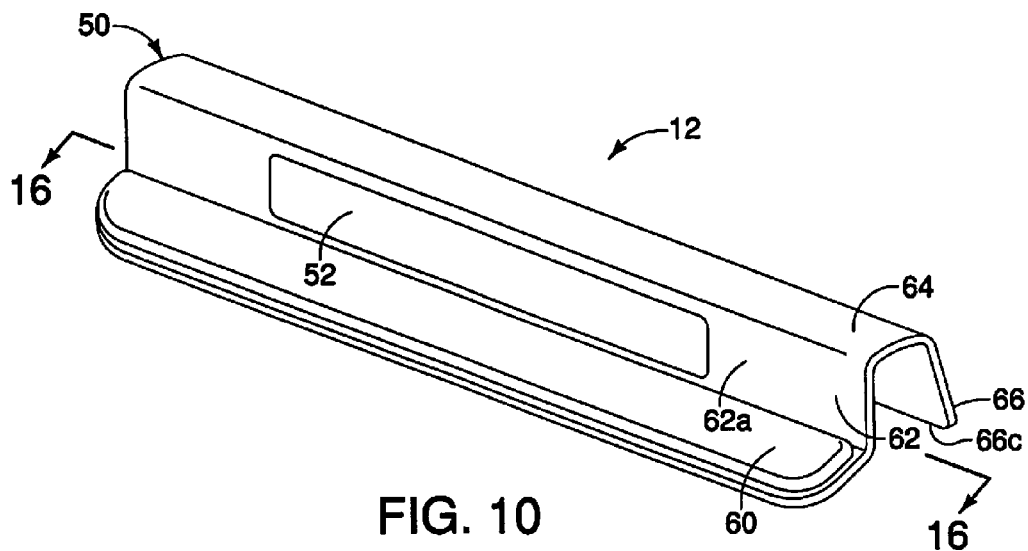
FIG. 10 is a perspective view of the illumination assembly shown removed from the sill structure showing a main body and an illumination panel on an outboard side thereof in accordance with the first embodiment.

As shown in FIGS. 8-10, the main body 50 of the sill illumination assembly 12 includes a kick plate portion 60, a first portion 62, and second portion 64 and a third portion 66. With the sill illumination assembly 12 installed to the sill structure 24, the kick plate portion 60 is dimensioned and contoured to cover an area of the kick plate surface 30 of the sill structure 24. The first portion 62 is dimensioned and contoured to cover an area of the first surface 32 of the sill structure 24 and the second seal $S_2$. The second portion 64 is dimensioned and contoured to cover an area of the second surface 34 of the sill structure 24. The third portion 66 is dimensioned and contoured to cover an area of the third surface 36 of the sill structure 24 and extend to an area adjacent to the floor F or contacting the floor F.

The kick plate portion 60 is generally horizontal but is inclined in the outboard direction $D_2$ in a manner consistent with the inclination of the kick plate surface 30 of the sill structure 24. In other words, the kick plate portion 60 of the main body 50 is configured to overlay and rest upon the kick plate surface 30 of the sill structure 24. As shown in FIG. 7, the kick plate portion can optionally include magnets M that serve to adhere and retain the kick plate portion 60 and the remainder of the main body 50 to the sill structure 24.

As shown in FIGS. 8 and 9, the first portion 62, the second portion 64 and the third portion 66 of the main body 50 together define an inverted U-shaped structure as viewed in cross-section or from either end thereof. The kick plate portion 60 extends from one leg of the inverted U-shaped structure in the outboard direction $D_2$.

As shown in FIG. 8, an underside surface 64a of the second portion 64 of the main body is provided with a plurality of fasteners F (only one is shown). The fasteners F are resilient metallic clips that compress as they are inserted into the holes 40 to removably retain the sill illumination assembly 12 to the sill structure 24. However, it should be understood that any of a variety of fasteners can be used in place of the fasteners F, provided they are configured for removal and re-installation of the sill assembly 12 to the sill structure 24.

As shown in FIG. 8, the illumination panel 52 is installed to an area of an outboard surface 62a the first portion 62 of the main body 50 such that the illumination panel 52 faces in the outboard direction $D_2$ with the main body 52 installed to the sill structure 24. Since the first portion 62 is a generally upright surface (vertically oriented) the illumination panel 52 is also upright. More specifically, with the door 18 in the open orientation as shown in FIG. 4, the illumination panel 52 faces outward (outboard) and is visible not only to a vehicle passenger entering the vehicle 10, but is also visible from areas distant from the vehicle 10.

The illumination panel 62 can be merely an illumination panel configured to provide light, or can be a liquid crystal display (LCD) configured to display text, images or other visual information provided via the controller 56.

As shown in FIGS. 8 and 9, the controller 56 (the circuitry) is installed to an inner surface 62b of the first portion 62 of the main body 50. The controller 56 includes circuitry configured to operate the illumination panel 52 such that the illumination panel 62 can display images and/or text, or can merely provide subtle entry lighting. The controller 56 further includes a wireless communication device such as WIFI and/or Bluetooth® that enables the controller 56 to communicate with a separate, external handheld device, such as a cellular telephone or tablet (not shown) with compatible WIFI communication capabilities. A vehicle passenger (not shown) can communicate via a handheld device with the controller 56 and program the controller 56 to cause the illumination panel 52 to display images, text or merely be illuminated by a specific color, or series of colors. Specifically, the handheld device is provided with an application or APP that is programmed to communicate over the WIFI directly with the controller 56 in order to program the controller 56 such that the illumination panel 52 displays the desired data.

Figure 16:
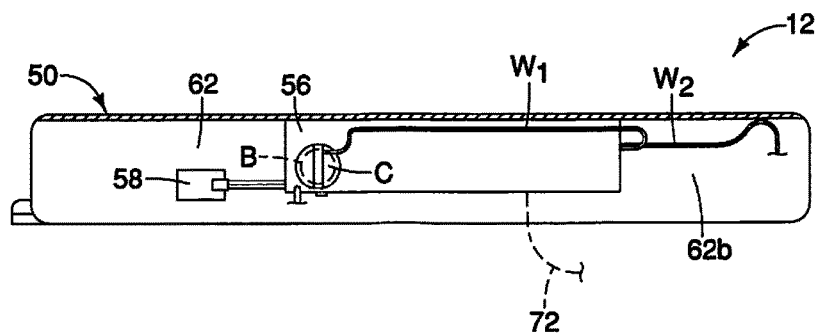
FIG. 16 is a cross-sectional view of the illumination assembly showing an interior surface of the circuitry that includes a battery cover, a batter chamber and a battery concealed therein in accordance with the first embodiment.

As shown in FIG. 16, the controller 56 is connected via wiring $W_1$, $W_2$ and $W_3$ to the light sources 54a-54d (FIG. 14) and the sensor 58. The light sources 54a and 54b are installed within the illumination panel 52 such that the light sources 54a and 54b provide illumination and/or back lighting to the illumination panel 52. The light sources 54c and 54d are connected to opposite ends of the light pipe L and are configured to illuminate the light pipe L as per programming of the controller 56. Specifically, the controller 56 can be programmed to illuminate the light pipe L to provide any of a plurality of lighting combinations that are separate and distinct from the operation of the illumination panel 52.

The light sources 54a-54d can be any of a variety of light emitting diodes (LEDs), active-matrix organic light-emitting diodes (AMOLCD) and/or organic light emitting diodes (OLCD). The light sources 54a-54d can all be the same, or can each be provided with one or more color illuminating capabilities and combinations, as needed and desired.

Although not shown, a portion of the sensor 58 can be exposed along a surface of the main body 50 such that that the sensor 58 can detect the orientation of the door 18. Specifically, the sensor 58 can detect whether the door 18 is in the open orientation or the closed orientation. The sensor 58 is can be an optical sensor that is positioned within the main body 50 such that it detects light when the door 18 is in the open position and is prevented from detecting light when the door 18 is closed. The sensor 58 can alternatively be any of a variety of other sensors. For example, the sensor 58 can be a proximity sensor that or a magnetic sensor, either of which detect the proximity of the door 18.

The controller 56 is connected to the sensor 58 such that the controller 56 is configured to illuminate the illumination panel 52 or cause the illumination panel 52 to display the programmed data in response to the sensor 58 detecting that the door 18 is in the open orientation. The controller 56 is further configured to cause the illumination panel 52 to cease illuminating or cease displaying the data in response to the sensor 58 detecting that the door 18 is in the closed orientation.

The light pipe L is an elongated member that can be made of, for instance, extruded acrylic material that is capable of refracting light. Specifically, when one or both of the light sources 54c and 54d is provided with power by the controller 56 and emit light, the light pipe L is configured to receive the light emitted from the light sources 54c and 54d and emit or shine that light along the length of the light pipe L. More specifically, when light is provided at either or both ends of the light pipe L, the light pipe L becomes illuminated and emits the received such that the light pipe L glows. It should be understood that the light pipe L can be made of any of a variety of materials, so long as those material can also carry light along the length of the light pipe L and become illuminated.

Figure 11:
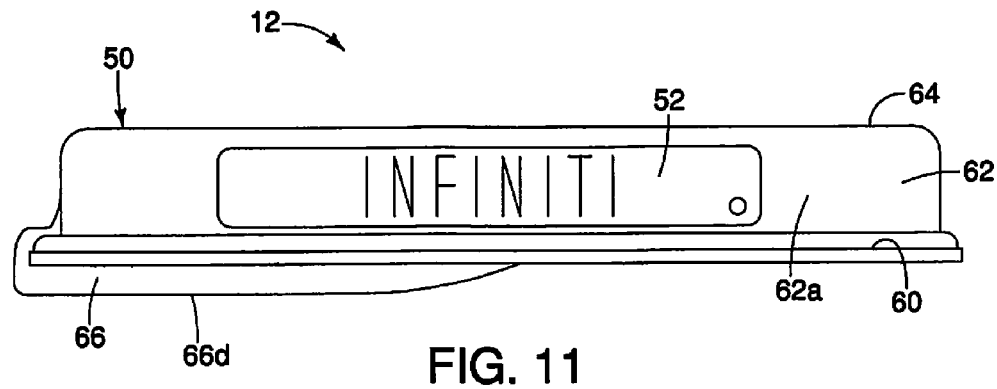
FIG. 11 is a side view of the illumination assembly depicted in FIG. 10 showing the outboard side of the main body of the illumination assembly and the illumination panel in accordance with the first embodiment.
Figure 12:
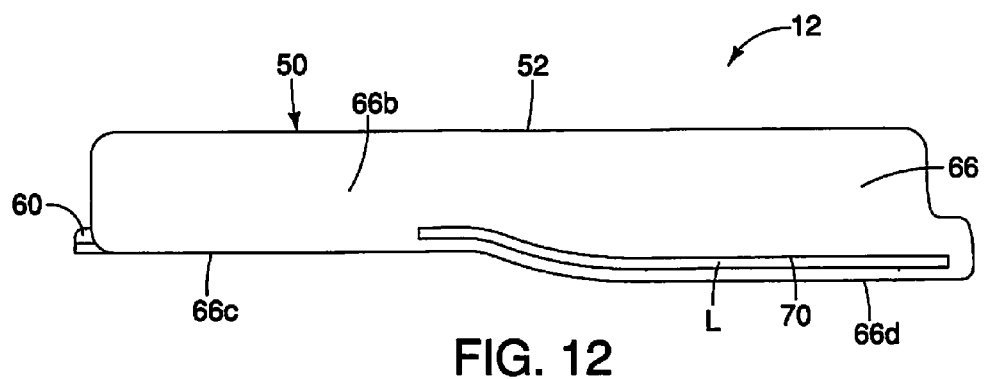
FIG. 12 is another side view of the illumination assembly depicted in FIGS. 9 and 10 showing an inboard side of the main body and a recess formed in the inboard side that is shaped and dimensioned such that a light pipe within the illumination assembly directs light to the floor of the vehicle in accordance with the first embodiment.
Figure 13:
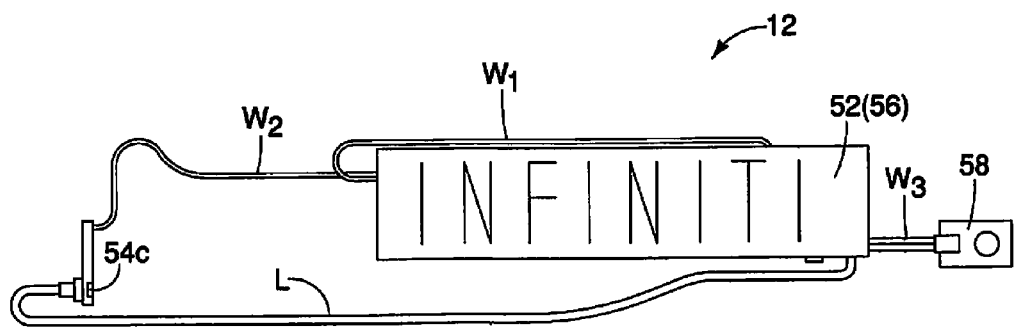
FIG. 13 is an outboard side view of the illumination panel shown removed from the main body, and further showing the light pipe and circuitry, in accordance with the first embodiment.
Figure 14:
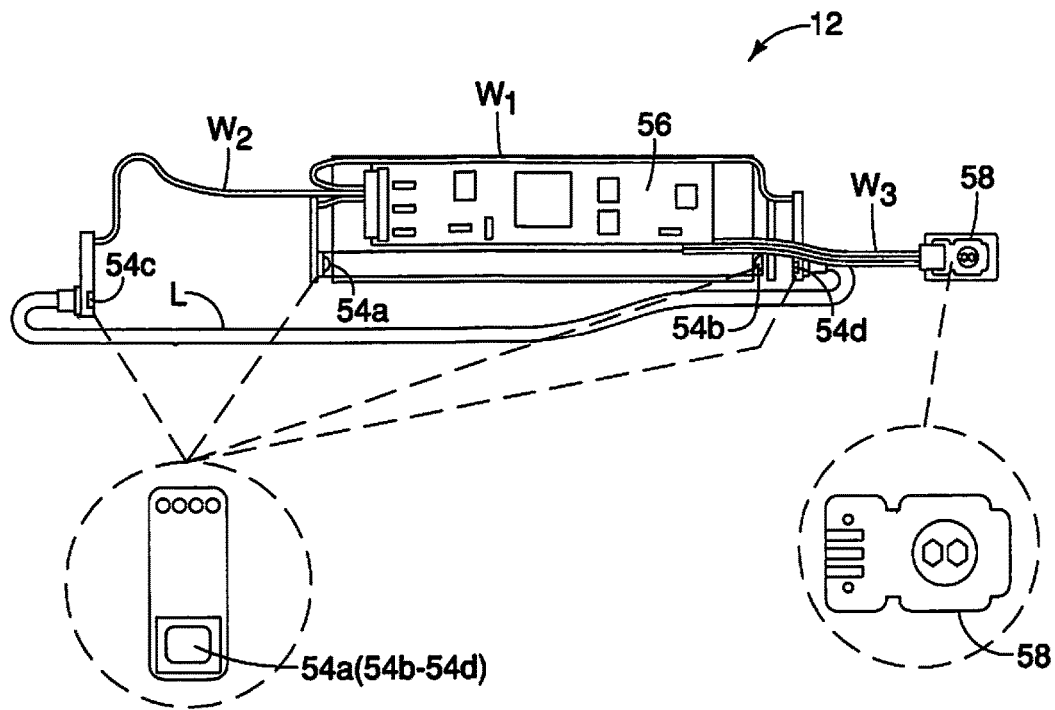
FIG. 14 is a schematic view of the circuitry and the light pipe with the illumination panel removed to reveal a controller in accordance with the first embodiment.
Figure 15:
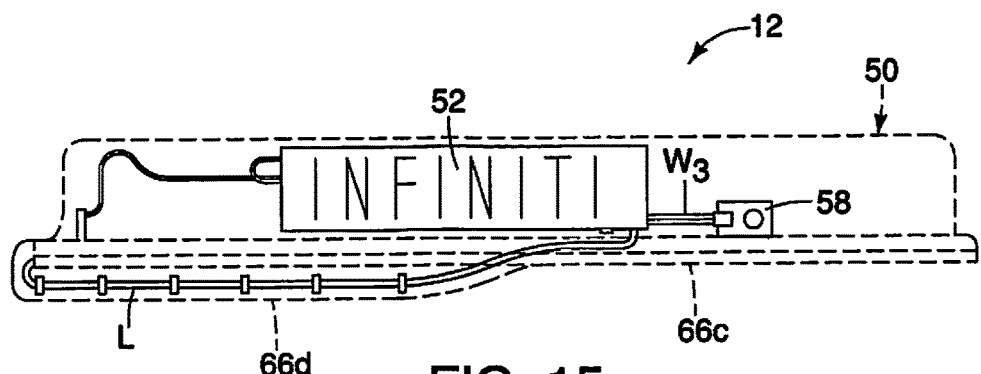
FIG. 15 is another side view of the outboard side of the illumination panel, the circuitry and the light pipe with the main body of the illumination assembly shown in phantom in accordance with the first embodiment.

The light pipe L is installed within the main body 50 along an outboard surface 66a, as shown in FIGS. 8, 9 and 15. As shown in FIGS. 8 and 9, the third portion 66 of the main body 50 has the outboard surface 66a and an inboard surface 66b. The outboard surface 66a is concealed with the sill illumination assembly 12 installed to the sill structure 24 and the inboard surface 66b is exposed. The third portion 66 defines a lower edge that includes a first edge portion 66c and a second edge portion 66d, as shown in FIGS. 11, 12 and 15. The light pipe 15 is attached to the outboard surface 66a by retaining clips or retaining projections. In the first embodiment, the light pipe 15 extends along most if not all of a section of the main body 50 along the second edge portion 66d.

The first edge portion 66c and the second edge portion 66d are shown with differing overall shapes and dimensions in the first embodiment. The first edge portion 66c is shaped to overlay a portion of the sill structure 24 or floor F that supports a front seat (not shown). The second edge portion 66d extends downward to overlay a portion of the sill structure 24 or the floor F that receive a passengers' feet. However, it should be understood from the drawings and the description herein, that the overall shape of the third portion 66 of the main body 50 can be modified to overlay the shape and contours of the sill structure and/or floor beneath it. In other words, the sill illumination assembly 12 is not required to include differing lower edge portions, such as the first edge portion 66c and the second edge portion 66d, but can include a third portion 66 with any of a variety of shapes and contours, including a straight lower edge.

The third portion 66 of the main body 50 includes an opening or gap 70 that is basically an elongated hole that extends from the outboard surface 66a to the inboard surface 66b. As shown in FIG. 12, the gap 70 has an irregular, non-linear overall shape corresponding to the contours of the first edge portion 66c and the second edge portion 66d. However, the gap 70 can alternatively be linear. The light pipe L is fixed to the outboard surface 66a in alignment with the gap 70. Hence, when the light pipe L is illuminated, light can shine through the gap 70. In other words, the light pipe L is exposed along the inboard surface 66b (the inboard side) of the third portion 66. As shown in FIGS. 8 and 9, the gap 70 has a wedged shape from either end thereof. In the first embodiment, the gap 70 is specifically shaped such that light from the light pipe L shines downward toward the floor F. More specifically, the light from the light pipe L is prevented from shining in an upward direction through the gap 70.

As shown in FIG. 16, the controller 56 within the main body 50 includes a battery chamber that is configured to retain the replaceable battery B. The battery B is accessed via a cover C that is removable in order to remove and replace the replaceable battery B. The battery B is an independent internal power cell that powers the controller 56, the light sources 54a-54d and the sensor 58. However, it should be understood from the drawings and the description herein that the sill illumination assembly 12 can alternatively be powered by the vehicle 10. In other words, the controller 56 can be directly wired into the circuitry of the vehicle 10 via an optional wiring connection 72, thereby eliminating the need for the battery B or supplementing the battery B.

The sill illumination assembly 12 is configured to be removable from the vehicle sill structure 24 and reinstalled to the vehicle sill structure 24 without tools. Specifically, the fasteners F and the magnets M are the primary structures that attach the sill illumination assembly 12 to the sill structure 24. However, additional fasteners or releasable adhesives can optionally be employed to attach the sill illumination assembly 12 to the sill structure 24. Specifically, the sill illumination assembly 12 is configured to be easily removed from the sill structure 24 such that with the sill illumination assembly 12 removed from the sill structure 24, the cover C is exposed and the battery B can easily be replaced. With the sill illumination assembly 12 installed to the sill structure 24, the cover C is concealed.

Second Embodiment

Figure 17:
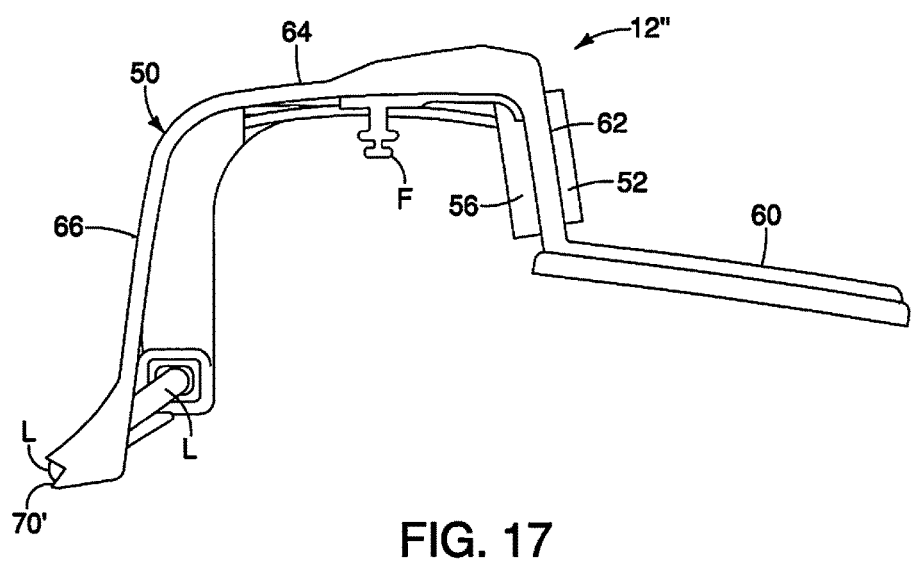
FIG. 17 is an end view similar to FIG. 9 showing an illumination assembly removed from the sill structure and the trim panel with a recess formed in an inboard side that is shaped and dimensioned such that a light pipe within the illumination assembly directs light to a passenger compartment of a vehicle in accordance with a second embodiment.

Referring now to FIG. 17, a sill illumination assembly 12" in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (') or a double prime (").

In the second embodiment, the sill illumination assembly 12" includes all of the features of the sill illumination assembly 12 of the first embodiment, including the first portion 62, the second portion 62, the third portion 66, the illumination panel 52, the controller 56 and the light pipe L. However, in the second embodiment, the gap 70 of the third portion 66 is slightly modified thereby defining a modified gap 70' through which light from the light pipe L can shine in an upward direction. Specifically, the modified gap 70' has a wedged shape such that light from the light pipe L shines downward toward the floor F and slightly upward providing illumination toward a passenger above the floor F. More specifically, the light from the light pipe L is not prevented from shining in an upward direction through the gap 70'.

The controller 56 preferably includes a microcomputer with a display and light control program that controls the illumination panel 52 and the light sources 54a-54d. The controller 56 can also include other conventional components such as an input interface circuit, an output interface circuit, and storage devices such as a ROM (Read Only Memory) device and a RAM (Random Access Memory) device. The microcomputer of the controller 56 is programmed to control the illumination panel 52 and the light sources 54a-54d, and receive signals from the sensor 58 in order to determine whether or not the door 18 is in the open orientation or the closed orientation. The memory circuit stores processing results and control programs such as ones for illumination operation that are run by the processor circuit. It will be apparent to those skilled in the art from this disclosure that the precise structure and algorithms for the controller 56 can be any combination of hardware and software that will carry out the functions of the present invention.

The various features and structures of the vehicle 10 other than the sill illumination assembly 12 are conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the sill illumination assembly. Accordingly, these terms, as utilized to describe the present invention should be interpreted relative to a vehicle equipped with the sill illumination assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle sill illumination assembly, comprising
    a vehicle sill structure at least partially defining a vehicle closure opening of a vehicle and having a first sill surface, a second sill surface, and a third sill surface, the first sill surface being an upright surface and an outboard facing surface, the second sill surface being horizontal and extending from an inboard upper end of the first sill surface and the third sill surface extending downward from an inboard end of the second sill surface, the third sill surface being an inboard facing surface;
    a seal installed to the vehicle structure along the intersection of the first sill surface and the second sill surface, the seal extending around the vehicle closure opening;
    a vehicle closure member movable between an open orientation exposing the vehicle sill structure and a closed orientation at least partially covering the vehicle sill structure;
    a sill trim assembly having a main body with a first portion, a second portion and a third portion that together define an inverted U-shaped structure as viewed in cross-section, the first portion having an upright surface, the second portion extending horizontally inboard from an upper edge of the first portion and the third portion extending downward from an inboard side of the second portion, the first portion at least partially covering the first sill surface, the second portion at least partially covering the second sill surface and the third portion at least partially covering the third sill surface, the second portion extending horizontally inboard from an upper end of the first portion and the third portion extending downward from an inboard edge of the second portion such that the sill trim assembly covers a section of the seal;

an illumination panel being installed to the upright surface of the first portion of the sill trim assembly such that the illumination panel is upright and faces in an outboard direction relative to the vehicle sill structure with the main body installed to the vehicle sill structure, and with the vehicle closure member in the closed orientation an inboard, interior upright surface of the vehicle closure member at least partially covers and contacts the illumination panel, and in the closed orientation the interior surface of the vehicle closure member further contacts portions of the seal not covered by the sill trim assembly;

an optical light pipe that extends along the third portion of the main body and is exposed along an inboard side of the third portion providing illumination along the third portion in an inboard direction to an interior of the vehicle; and a controller within the sill trim assembly and configured to control illumination of the illumination panel and control illumination of the optical light pipe.

2. The vehicle sill illumination assembly according to claim 1, wherein the main body includes a fourth portion that extends in an outboard direction from a lower end of the first portion, the fourth portion defining a kick plate.

3. The vehicle sill illumination assembly according to claim 1, wherein the controller includes an independent internal power cell.

4. The vehicle sill illumination assembly according to claim 3, wherein the independent internal power cell comprises a replaceable battery.

5. The vehicle sill illumination assembly according to claim 4, wherein the sill trim assembly includes a battery chamber configured to retain the replaceable battery and a cover that is removable in order to remove and replace the replaceable battery.

6. The vehicle sill illumination assembly according to claim 5, wherein the sill trim assembly is configured to be removable from vehicle sill structure and with the sill trim assembly removed from the vehicle sill structure, the cover is exposed, and with the sill trim assembly installed to the vehicle sill structure, the cover is concealed.

7. The vehicle sill illumination assembly according to claim 1, wherein the illumination panel includes a connector configured for attachment to a power source of the vehicle.

8. The vehicle sill illumination assembly according to claim 1, wherein the main body further includes a fourth portion that extends outboard from a lower end of the first portion.

9. The vehicle sill illumination assembly according to claim 1, wherein
the controller includes a photoelectric sensor that is at least partially covered with the vehicle closure member in the closed orientation and exposed with the vehicle closure member in the open orientation, and
the controller is configured to illuminate the illumination panel in response to the photoelectric sensor detecting that the vehicle closure member is in the open orientation and cease illumination of the illumination panel in response to the photoelectric sensor detecting that the vehicle closure member is in the closed orientation.

10. The vehicle sill illumination assembly according to claim 1, wherein the controller includes a wireless communication device.

11. The vehicle sill illumination assembly according to claim 1, wherein the illumination panel includes a liquid crystal display.

12. The vehicle sill illumination assembly according to claim 11, wherein the controller includes an output adjusting circuit that controls an output of the liquid crystal display.

13. The vehicle sill illumination assembly according to claim 1, wherein
the with the vehicle closure member in the open orientation the illumination panel is exposed and illuminates areas outboard of the vehicle sill structure.

* * * * *